United States Patent [19]

Noe

[11] 4,385,643
[45] May 31, 1983

[54] PLUG FOR HIGH-PRESSURE TESTING OF TUBES

[76] Inventor: Renato R. Noe, 1609 West St., Union City, N.J. 07087

[21] Appl. No.: 302,844

[22] Filed: Sep. 16, 1981

[51] Int. Cl.³ .................... F16L 55/10; G01M 3/02
[52] U.S. Cl. ..................... 138/90; 73/49.1;
  73/49.5; 220/236; 220/237; 285/DIG. 22
[58] Field of Search ............... 73/49.1, 49.5; 138/89,
  138/90, 93, 96 R; 285/DIG. 22; 220/235, 236,
  237, 238, 284

[56] References Cited

U.S. PATENT DOCUMENTS

| | | | |
|---|---|---|---|
| 2,300,019 | 10/1942 | Smak | 220/235 |
| 2,374,947 | 5/1945 | Nicholson | 138/90 |
| 2,375,995 | 5/1945 | Kaeser | 220/236 |
| 2,475,748 | 7/1949 | Leroy | 138/90 |
| 2,607,370 | 8/1952 | Anderson | 220/238 X |
| 2,923,323 | 2/1960 | Franck | 138/89 |
| 2,974,685 | 3/1961 | Ver Nooy | 138/90 |
| 3,042,116 | 7/1962 | Sharp et al. | 138/89 X |
| 3,323,551 | 6/1967 | Bell et al. | 138/90 |
| 3,499,469 | 3/1970 | Vizuete et al. | 73/49.1 X |
| 3,889,714 | 6/1975 | Wilger et al. | 138/89 |
| 4,266,814 | 5/1981 | Gallagher | 285/DIG. 22 X |

Primary Examiner—Stephen Marcus
Assistant Examiner—Mark Thronson
Attorney, Agent, or Firm—Bernard J. Murphy

[57] ABSTRACT

In the embodiment shown, the Plug comprises an elongate body which has a throughgoing passage formed therein and an external ramp surface. A plurality of jaws are independently engaged with the body, and constrained thereon, for movement along the ramp surface to cause the jaws to extend and grip the inside surface of a to-be-tested tube. The body is externally threaded and receives an internally-threaded nut which is used to move the jaws along the ramp surface. One end of the body has land surfaces formed thereon to accommodate a quick-disconnect coupling thereat of a tube. The opposite end of the body has an expandable seal, for sealingly engaging the inside surface of the to-be-tested tube. The seal comprises a nosepiece, centrally bored, with a hexagonal socket formed therein, and a hollow shaft, externally threaded, which threadedly engages an internal thread formed in the mating end of the body. A compliant annulus is interposed between the latter end of the body and the nosepiece and, in response to threaded movement of the nosepiece toward the aforesaid end of the body, compresses and increases in outside diameter.

14 Claims, 4 Drawing Figures

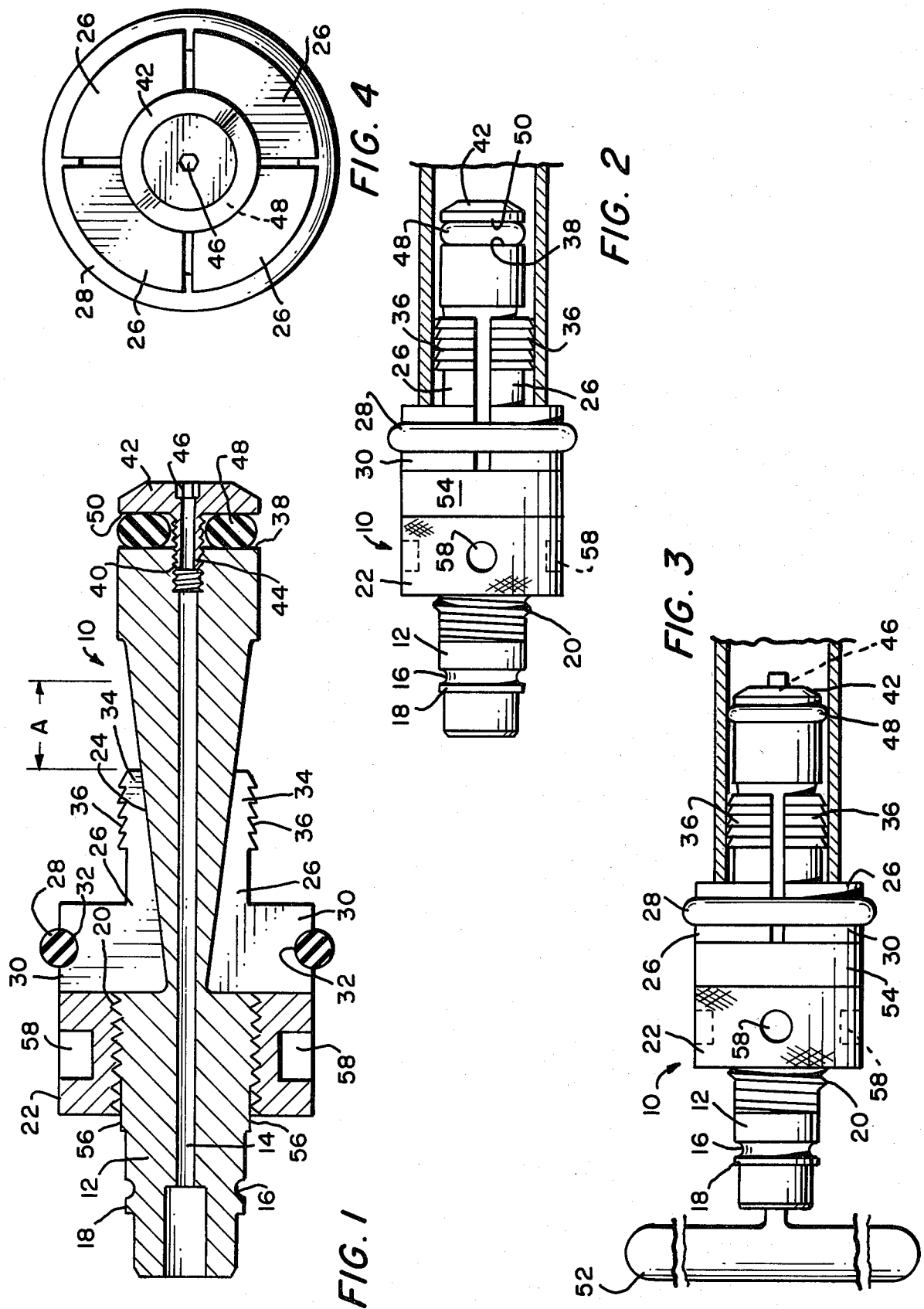

PLUG FOR HIGH-PRESSURE TESTING OF TUBES

This invention pertains to plugs, and in particular to plugs designed for a high-pressure testing of tubes in tube-and-shell heat exchangers or the like.

Plugs of the type to which this invention pertains are known in the prior art, and typical or exemplary thereof are the Boiler Tube Test Plug, of U.S. Pat. No. 2,475,748, issued to Gene LeRoy, on July 12, 1949, and the Self Sealing Pressure Plug, of U.S. Pat. No. 3,499,469, issued on Mar. 10, 1970, to B. Vizuete et al.

Notwithstanding the innovative teachings of such known plugs, they have limitations which call for novel improvements. The LeRoy test plug, for instance, has a plurality of tube-gripping jaws which are caused to move along a ramp surface, to come into fast engagement with the inside surface of a to-be-tested tube. The jaws, however, are quite narrow, rib-like members. Each thereof applies a considerable pressure to a limited area of the tube surface and, accordingly, can easily score or even penetrate the tube wall. Additionally, the LeRoy test plug employs a wide rubber seal which is held captive by angular grooves in separate elements, and the elements are caused to close upon each other to expand the seal. The edges of the grooves, relative to which the seal expands and contracts, invite premature disintegration of the seal. Tapered edges of the seal-expanding elements are moved toward each other beneath the inner circumference of the seal, and this too puts the integrity of the seal in undue jeopardy. With repeated use, such edges will remove particles of the seal. Finally, the jaws are formed on the ends of spring arms which, with time, will fatigue and fail to retract sufficiently to accommodate given tube inside diameters; such requires replacement of the jaws, arms and an annulus with which the latter are integral, and this constitutes a significant expense.

The plug of the Vizuete et al. disclosure likewise relies upon a biasing spring for proper operation, as well as the fluid pressure of the tube system being tested. The spring replacement is also expensive, and requires disassembly of the plug to do so. This latter plug, also, has an annular, compliant seal for closing upon the inside surface of the to-be-tested tube, and the seal is caused to expand through the movement thereupon of an end tip and a sleeve. However the seal-engaging surfaces of the tip and sleeve are "sloped" (tapered). Thus, the surfaces will tend to expand the inside diameter of the seal, as well as the outside diameter, diminishing the amount of sealing engagement which the inside diameter effects with the seat upon which it is nested. As a consequence of this, there obtains a greater possibility of the to-be-sealed fluid insinuating itself underneath the Vizuete et al. expanded seal.

Such prior art being considered, it is an object of this invention to set forth an improved plug for high-pressure testing of tubes which is not susceptible of the aforesaid technical limitations.

It is particularly an object of this invention to disclose a plug, for high-pressure testing of tubes, comprising an elongate body; said body having a passage formed internally thereof and extending throughout the full length of said body; said body further having means defining an external ramp surface thereon; a plurality of jaws externally and independently engaged with said body, intermediate the length of said body, and movable axially thereof for travel along said ramp surface; means constraining said plurality of jaws in engagement with said body; said ramp surface having a plurality of increasing outside diameters; means engaged with said body operative for moving said plurality of jaws axially of said body and along said ramp surface; means defining an expandable seal; said seal and one end of said body having means cooperatively coupling said seal to said one end; and said seal having means, cooperative with said coupling means, manipulatable to cause said seal to expand.

Further objects of this invention, as well as the novel features thereof, will become more apparent by reference to the following description, taken in conjunction with the accompanying figures, in which:

FIG. 1 is an axial cross-sectional view of the novel plug, according to an embodiment thereof;

FIG. 2 is a side elevational view of the plug of FIG. 1, shown in a cross-sectioned, fragment of a to-be-tested tube, with the jaws thereof ramped into fast engagement therewith;

FIG. 3 is a view like FIG. 2, showing the seal expanded into sealing engagement with the test tube, and showing the operative tool in use therewith; FIGS. 2 and 3 are in smaller scale than FIG. 1; and FIG. 4 is an end view of the plug of FIGS. 1-3, from the sealing end thereof, in the scale of FIG. 1.

As shown in the figures, the novel plug 10, according to an embodiment thereof, comprises an elongate body 12 which has a throughgoing passage 14 formed therein. At a first end of the body are formed a recessed groove 16 and a raised annular land 18 which, together with the terminal end of the body thereat, define means for accommodating a quick-disconnect connection for a hose or the like.

The body 12 is externally threaded at 20 and threadedly receives thereat an internally threaded nut 22. The body also has a ramp surface 24 which comprises a multiplicity of increasing diameters. Four jaws 26 are clustered about the body 12, and held thereto by a constraining O-ring 28. Each jaw defines substantially a sector or quadrant of a circle, and has a radial land 30 in which is formed an arcuate groove 32 for nesting the ring 28. Each jaw also has a projecting limb 34 which terminates with external serrations or teeth 36.

The end of the body 12 which is opposite the quick-disconnect end terminates in a flat bearing surface 38, and the terminal end of the passage 14 thereat is internally threaded at 40. A nosepiece 42, comprising a centrally-apertured tip and a hollow shaft 44 is coupled to the body 12. The hollow shaft 44 is externally threaded, and is threadedly engaged with the threading 40 of the passage 14. In the outermost end of the nosepiece 42, within the aperture thereof, is formed a hexagonal bore 46. Interposed between the nosepiece 42 and the bearing surface 38 is another O-ring seal 48. The innermost surface of the tip of the nosepiece, indicated by index number 50, is a flat bearing surface like that of surface 38.

Upon the teeth 36 and limbs 34 being inserted into a to-be-tested tube, along with the tip and nosepiece, seal 48, and ramp surface 24, the jaws 26 and seal 48 can be expanded into engagement therewith. According to procedures well known in this technology, the jaws are first put into fastening engagement with the tube under test, and then the seal is expanded. In use of the novel plug 10, it is only necessary to rotate the nut 22 to cause the four, substantially quadrant jaws to travel along the ramp surface 24 and expand into gripping engagement with the inside diameter of the tube. As the jaws 26 and the teeth 36 thereof, together, encompass substantially a full circle, no one thereof unduly pressures the inside surface of the tube; rather, the engaging or locking pressure is substantially uniformly distributed about the inside of the tube.

With the teeth 36 firmly engaged with the inside of the tube under test, as shown in FIG. 2, the seal 48 is next expanded therein. As shown in FIG. 3, an Allen wrench 52 is inserted into the passage 14 and through the aperture of the nosepiece 42 for engagement with the hexagonal bore 46. Then, by rotating the wrench 52, the hollow shaft 44 is caused to retract inwardly, along the threads 40 of the body 12. Consequently, the bearing surfaces 38 and 50 close upon the seal 48. As the surfaces 38 and 50 are flat, the seal is compressed, its cross-section becomes elongated or elliptical, whereupon the outside diameter thereof is enlarged uniformly, fully thereabout. The inside diameter thereof, however, remains the same, and maintains its fast and full sealing engagement thereof with the hollow shaft 44. In such constraint, the seal experiences a compressed increase in density which enhances its ability to close off the tube under test to fluid conduct.

Due to the given length of threading 20 on the body 12, the nut 22 will be effective for causing movement of the jaws 26 a given distance "A" (FIG. 1). If it is desired to cause the jaws to move a greater distance, a spacer is used. FIGS. 2 and 3 show such a spacer 54; it comprises a simple annulus which is interposed between the nut 22 and the jaws 26.

What is particularly notable about this improved plug design is the independent deployment of the jaws 26 in cluster about the body 12, and the novel simplicity with which they are retained, and replaceable, by the O-ring 28. The limbs 34 are solid, and not subject to "spring" fatigue. That which, with time, will fatigue, and require replacement, is the readily accessible and relatively inexpensive O-ring 28, as well as the equally accessible O-ring seal 48.

To facilitate the expansion of the jaws 26, the body 12 has wrench flats 56, and the knurled nut 22 has spanner wrench holes 58 formed therein. Simply, by holding the flats 56 and rotating the nut with the spanner wrench, the nut 22 can be torqued up with ease. Also, if found useful, the flats 56 may be held with a wrench while the Allen wrench 52 is applied to the hexagonal bore 46.

While I have described my invention is connection with a specific embodiment thereof, it is to be clearly understood that this is done only by way of example, and not as a limitation to the scope of my invention, as set forth in the objects thereof and in the appended claims. For example, that which is shown is of a given, relative gauge. Clearly, the dimensions of the jaws 26 and the nosepiece 42 and seal 48 can be larger—or smaller—to be useful with tubes of differing dimensions. Also, four jaws 26 are shown, and this is a preferred embodiment of the invention. However, the novel plug lends itself to other quantities of jaws: three, five, etc. These, and all other modifications of the depicted embodiment are deemed to be within the scope of my invention and within the ambit of the claims.

I claim:

1. A plug, for high-pressure testing of tubes, comprising:
    an elongate body;
    said body having a passage formed internally thereof and extending throughout the full length of said body;
    said body further having means defining an external ramp surface integral therewith;
    a plurality of jaws externally and independently engaged with said body, intermediate the length of said body, and movable axially thereof for travel along said ramp surface;
    means constraining said plurality of jaws in engagement with said body;
    said ramp surface having a plurality of increasing outside diameters;
    means engaged with said body operative for moving said pluraliy of jaws axially of said body and along said ramp surface;
    means defining an expandable seal;
    said seal and one end of said body having means cooperatively coupling said seal to said one end; and
    said seal having means, cooperative with said coupling means, manipulatable to cause said seal to expand diametrically uniformly.

2. A plug, for high-pressure testing of tubes, according to claim 1, wherein:
    said plurality of jaws are slidably engaged with said body.

3. A plug, for high-pressure testing of tubes, according to claim 1, wherein:
    each of said jaws of said plurality thereof substantially encompasses a quadrant of a circle.

4. A plug, for high-pressure testing of tubes, according to claim 3, wherein:
    said plurality of jaws defines a sectored annulus.

5. A plug, for high-pressure testing of tubes, according to claim 1, wherein:
    said seal comprises a compliant annulus; and
    said manipulative cooperative means comprises means operative for simultaneously increasing the outside diameter of said annulus while compressing said annulus and maintaining the inside diameter of said annulus.

6. A plug, for high-pressure testing of tubes, according to claim 1, wherein:
    said seal comprises a circular, centrally-apertured nosepiece,
    said nosepiece having a hollow shaft extending therefrom and normal thereto, and
    a compliant annulus;
    said body having a flat bearing surface at said one end thereof;
    said nosepiece having a flat bearing surface thereon at the side thereof from which extends said hollow shaft;
    said shaft is movably engaged with said passage in said body, with said bearing surfaces in confronting relationship; and
    said annulus is interposed between said bearing surfaces and resiliently constrained about said hollow shaft.

7. A plug, for high-pressure testing of tubes, according to claim 6, wherein:
    said nosepiece central aperture has a prescribed, tool-receiving geometric pattern.

8. A plug, for high-pressure testing of tubes, according to claim 1, wherein:
    said body is externally threaded intermediate the length thereof; and said jaws-moving means comrpises an internally-threaded nut, said nut being threadedly engaged with said said body.

9. A plug, for high-pressure testing of tubes, according to claim 8, wherein:
said plurality of jaws and said nut are in confronting relationship, whereby threaded movement of said nut lengthwise of said body causes said plurality of jaws to move along said ramp surface a given distance.

10. A plug, for high-pressure testing of tubes, according to claim 9, further including:
means interposed between said plurality of jaws and said nut, and cooperative therewith, for causing said plurality of jaws to move along said ramp surface farther than said given distance, in response to threaded movement of said nut lengthwise of said body.

11. A plug, for high-pressure testing of tubes, according to claim 10, wherein:
said interposed means comprises an apertured spacer.

12. A plug, for high-pressure testing of tubes, according to claim 1, wherein:
said body further has means formed on the end thereof which is opposite said one end for accommodating thereat a quick-disconnect connection for hose or the like.

13. A plug, for high-pressure testing of tubes, comprising:
an elongate body;
said body having a passage formed internally thereof and extending throughout the full length of said body;
said body further having means defining an external ramp surface thereon;
a plurality of jaws externally and independently engaged with said body, intermediate the length of said body, and movable axially thereof for travel along said ramp surface;
means constraining said plurality of jaws in engagement with said body;
said ramp surface having a plurality of increasing outside diameters;
means engaged with said body operative for moving said plurality of jaws axially of said body and along said ramp surface;
means defining an expandable seal;
said seal and one end of said body having means cooperatively coupling said seal to said one end; and
said seal having means, cooperative with said coupling means, manipulatable to cause said seal to expand; wherein
said seal comprises a circular, centrally-apertured nosepiece,
said nosepiece having a hollow shaft extending therefrom and normal thereto. and
a compliant annulus;
said body having a flat bearing surface at said one end thereof;
said nosepiece having a flat bearing surface thereon at the side thereof from which extends said hollow shaft;
said shaft is movably engaged with said passage in said body, with said bearing surfaces in confronting relationship; and
said annulus is interposed between said bearing surfaces and resiliently constrained about said hollow shaft; wherein
said one end of said body and said hollow shaft are mutually threaded and threadedly engaged for relative amovement therebetween.

14. A plug, for high-pressure testing of tubes, according to claim 13, wherein:
said one end of said body is internally threaded, and said hollow shaft is externally threaded.

* * * * *